Oct. 9, 1951   F. A. ANETSBERGER   2,570,628
DEEP FAT FRYER
Filed Jan. 8, 1949

INVENTOR.
Frank A. Anetsberger
BY
Sheridan, Davis & Cargill
Attys

Patented Oct. 9, 1951

2,570,628

UNITED STATES PATENT OFFICE 2,570,628

DEEP FAT FRYER

Frank A. Anetsberger, Chicago, Ill., assignor to Anetsberger Brothers, Inc., Northbrook, Ill., a corporation of Illinois Application January 8, 1949, Serial No. 69,970

2 Claims. (Cl. 99—408)

This invention relates to improvements in deep fat fryers.

One object of the invention is to provide, in a deep fat fryer, an improved crumb tray for collecting crumbs or food particles and holding the later above the bottom of the pot to prevent scorching and charring of the crumbs which give the fat a murky appearance and affects the taste of food products subsequently cooked in the fat. Removing the food particles or crumbs from the fat without permitting them to first rest upon the bottom of the hot pot prolongs the period of usefulness of a batch of the cooking fluid. Crumb trays have heretofore been used in deep fat fryers, and in some instances have been provided with perforations which permit the cooking fat to drain from the tray when the latter has been lifted from the fat preparatory to the removal of the crumbs. However, such perforations or strainer sections have permitted the finer crumbs to pass through the perforations with the fat, and return to the body of the cooking fluid so that some eventually settle to the bottom of the pot and become charred, thus shortening the period of usefulness of the cooking fluid.

Another object of the invention, therefore, is to provide a crumb tray for a deep fat fryer that collects crumbs which break away from particles of food during cooking operations, and retains the crumbs above the hot pot bottom, and which also enables the residual oil to be drained from the tray upon manual elevation of the tray, without escape of the finer crumbs back into the pot.

A more specific object of the invention is to provide a crumb tray for a deep fat fryer having the strainer portion provided with crumb baffles at a level below the strainer section to provide traps that produce relatively quiescent fluid bodies within the tray, and within which the crumbs settle out from the main body of the fluid which generally circulates downwardly into the tray and through the strainer openings.

Other objects of the invention relate to various features of construction and arrangement of parts, which will be apparent from a consideration of the following specification and accompanying drawings, wherein.

Figure 1:
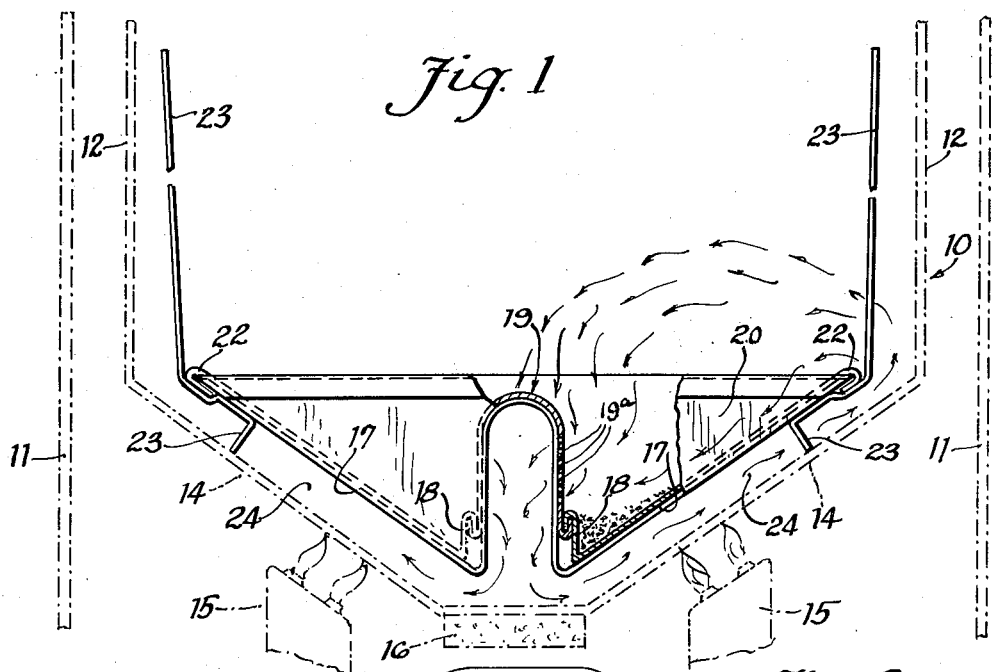
Figure 1 is a broken end elevation of a crumb tray which is illustrative of the present invention, the tray being shown in operative position within the pot of a deep fat fryer shown fragmentarily.
Figure 2:
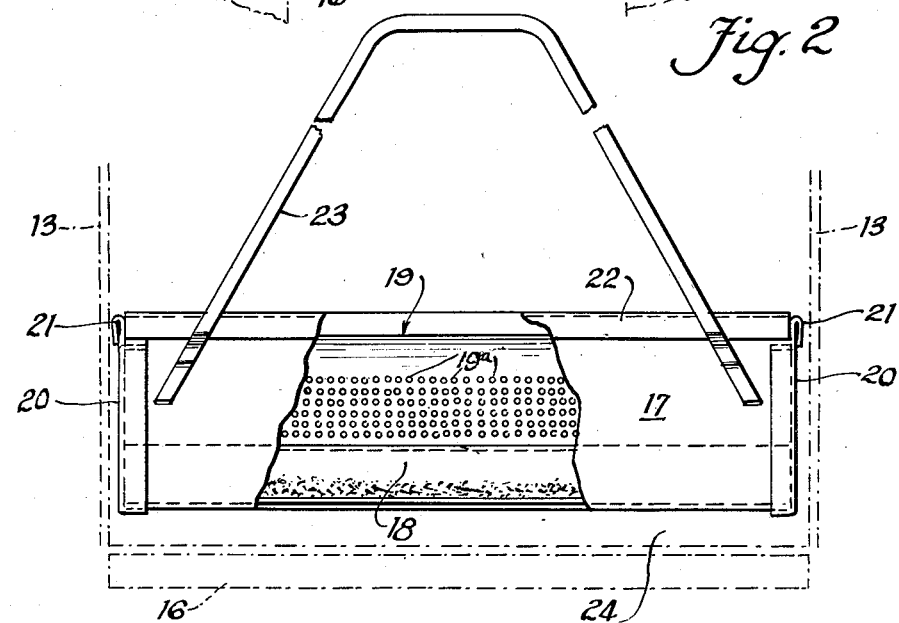
Fig. 2 is a broken side elevational view of the tray.

In Fig. 1 of the drawings, a pot of a deep fat fryer is indicated generally by the numeral 10, the pot being supported in a suitable casing indicated by the exterior walls 11. The pot disclosed is provided with vertical side walls 12 and vertical end walls 13, and a generally V-shaped bottom.

The bottom is composed of inclined sections 14 which are convergent toward the center line of the pot. Burners are provided which apply heat to the inclined bottom sections 14; the burners shown in the drawings being gas burners indicated by the numeral 15. The two burners generally are integrally formed and supplied with fuel from a common manifold, not shown. The provision of the burner with the two spaced apart burner sections 15 is for the purpose of effecting a predetermined circulation of fat within the pot. It will be noted that the burners 15 are disposed each laterally of the center line of the bottom of the pot, the latter of which receives little or no heat directly from the burners and may, if desired, be provided with a heat insulating member 16 for the purpose of reducing the application of heat to the central portion of the pot.

As will be understood, food to be cooked in the deep fat within the pot generally is placed in a perforated or foraminous basket. Particles of food or crumbs frequently are dislodged from the food being cooked, and tend to gravitate to the bottom of the pot where it is likely to become scorched or charred, and in time to cause the discoloration of the fat as well as to affect the taste of food subsequently cooked therein. For the purpose of preventing dislodged food particles from reaching the bottom of the pot, a crumb tray is provided which, in the form illustrated, is provided with two inclined imperforate bottom sections 17, which at their lower ends terminate in upstanding flanges or baffles 18 laterally spaced apart, as shown in Fig. 1. Attached to the upper ends of the baffles 18 is a strainer member indicated generally by the numeral 19. The strainer at its lower edges may be seamed, as indicated, or otherwise appropriately attached to the upper edges of the baffles 18. The strainer member 19 is provided with perforations in the side walls, as indicated at 19a. These perforations may extend over the upper cylindrical end of the strainer member, if desired. The strainer member is coextensive with the length of the bottom sections 17. End walls 20 of generally triangular form are provided, which are attached to the ends of the bottom sections 17, as well as to the ends of the strainer member 19. The end walls 20 are shown as having their upper edges rolled or folded over at 21, as are the upper edges of the bottom sections 17, as indicated at 22. Handles 23 are provided on opposite sides of the pot which may be spot welded to the upper portions of a bottom section 17, and are provided preferably with outwardly turned ends 23 which constitute stops or spacers for spacing the bottom section 17 from the corresponding bottom sections 14 of the pot, thus providing therebetween oil circulation passages 24 which communicate at their lower ends with the interior of the strainer member 19, and at their upper ends with the superjacent portion of the interior of the pot.

The application of heat by the burners 15 to the inclined bottom sections 14 of the pot tend to cause the fat to circulate upwardly and laterally through the channels 24, as indicated by the arrows in Fig. 1. After the circulating streams have reached the upper edges of the bottom walls 17 of the tray the fluid moves toward the center line of the pot, and thence downwardly. This circulation is effected by the location of the burners away from the center line of the pot, as described, in cooperation with the lack of substantial heat application to the central portion of the pot, which thus remains somewhat cooler. The upward flow of oil past the longitudinal edges of the tray and the movement of the currents inwardly toward the center line of the tray tend to carry crumbs and food particles that are deposited in the superjacent oil onto the tray bottom; i. e., the movement of the fluid tends to prevent the entrance of food particles through the upper ends of the channels 24 where they would eventually settle on the pot bottom and become scorched or charred and impair the period of usefulness of the cooking fluid.

The fat flowing downwardly toward the central portion of the tray passes through the perforations 20 which strain out the particles of food, causing the same to be deposited in the subjacent bottom sections 17 of the tray.

The baffles 18 in actual practice are about 1 inch in height and, as will be seen, the upper edges define the level of quiescent pools in the lowermost portions of each tray bottom section into which the crumbs tend to gravitate. Once the crumbs have settled within these pools, they remain undisturbed by the circulation of the fluid, since the pools are below the lowermost of the perforations in the strainer member 19. Hence, when crumbs are released from food particles, the circulation of oil within the pot, as above described, tends to carry the crumbs toward the center line of the pot and into the tray where they settle out of the circulating oil, as above mentioned.

Periodically, the tray is elevated manually by means of the handles 23 above the body of the fluid in the pot, to permit the bulk of the oil in the tray to drain through the perforations 20 and back into the pot. By tilting the tray first to one side and then to the other, the residual oil in the lowermost portions of the tray bottom sections can be drained through the perforations, after which the crumbs are removed and the tray replaced in the pot for further use.

The provision of the upstanding baffles 18, which provide the quiescent zones or pools above referred to, is of advantage in that the fine particles of food that are deposited therein are actually beyond the influence of the circulating fluid. The use of the tray described in deep fat fryer pots, results in maintenance of the oil in a clear condition by avoiding the deposit of the particles upon the hot bottom sections 14, and thus prolongs the period of usefulness of a particular batch of the oil or fat.

While I have shown and described a structure which is illustrative of my improvements, various changes and details in the structure illustrated may be resorted to without departing from the spirit of the invention defined by the appended claims.

I claim:

1. In combination, a pot for a deep fat fryer having a V-shaped bottom and a source of heat beneath each inclined bottom section for inducing circulation of fat in the pot including lateral ascending currents originating above the heat sources and descending intermediate currents, and a crumb tray for the pot adapted to be positioned in the fat comprising a V-shaped bottom the sections of which are spaced apart and turned upwardly to provide baffles at the lower edges, means for spacing the inclined sections of the bottom of the tray from the corresponding portions of the bottom of the pot to provide passages between the inclined sections of the tray and the corresponding portions of the pot for directing the upward lateral currents of fat toward the opposite sides of the pot whence the current moves over the tray and downwardly whereby crumbs released from particles of food cooking in the fat above the tray are constrained to move downwardly into the tray, said tray having an inverted U-shaped strainer member joined at the lower edges to the upper edges of said baffles and provided with strainer perforations in the sides through which the downwardly directed currents pass, the lowermost of said perforations being spaced above said baffles whereby the latter provide traps at each side of said strainer member in the lowermost portions of the tray for receiving deposited crumbs and for retaining the same at a level beneath the currents of fat flowing through said perforations.

2. A removable crumb collecting tray for use in a deep fat fryer provided with a pot having bottom sections that incline toward a longitudinal center line of the pot, said tray being provided with inclined bottom sections terminating at the lower ends in parallel spaced-apart upturned baffles providing traps at the lowermost portion of each inclined bottom section of the tray, depending legs on the under side of the tray for spacing the bottom sections thereof from the bottom sections of the pot, end walls for the tray secured to the ends of the bottom sections of the tray, and an inverted U-shaped member of perforated sheet metal arching the space between said baffles and attached at the lower edges to said baffles and secured at the ends to said end walls of the tray whereby crumbs carried into the tray by descending currents of hot fat flowing downwardly to and through the perforations of said member during cooking operations are collected within said traps.

FRANK A. ANETSBERGER.

REFERENCES CITED

The following references are of record in the file of this patent:

UNITED STATES PATENTS

| Number | Name | Date |
|---|---|---|
| 1,185,890 | Ekvall | June 6, 1916 |
| 2,071,467 | Kowvallis | Feb. 23, 1937 |
| 2,136,535 | Anetsberger | Nov. 15, 1938 |
| 2,154,391 | Anderson | Apr. 11, 1939 |

FOREIGN PATENTS

| Number | Country | Date |
|---|---|---|
| 418,015 | Great Britain | Oct. 17, 1934 |